UNITED STATES PATENT OFFICE.

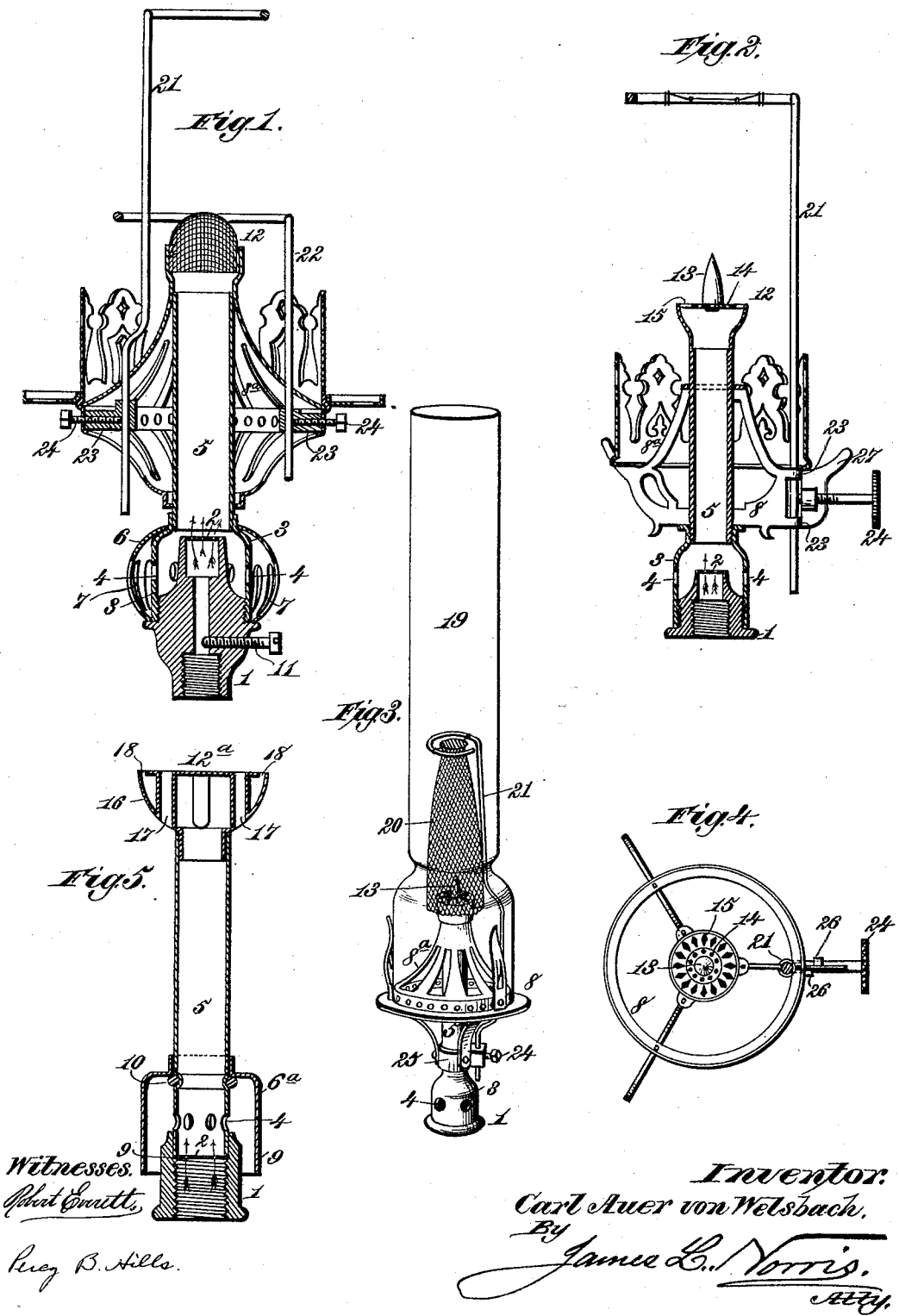

CARL AUER VON WELSBACH, OF VIENNA, AUSTRIA-HUNGARY, ASSIGNOR TO THE WELSBACH INCANDESCENT GAS LIGHT COMPANY, OF NEW JERSEY.

INCANDESCENT GAS-LAMP.

SPECIFICATION forming part of Letters Patent No. 409,530, dated August 20, 1889.

Application filed March 31, 1888. Serial No. 269,203. (No model.) Patented in England July 28, 1886, No. 9,755.

*To all whom it may concern:*

Be it known that I, CARL AUER VON WELSBACH, a subject of the Emperor of Austria-Hungary, residing at Vienna, Austria-Hungary, have invented new and useful Improvements in Incandescent Gas-Lamps, (for which I obtained Letters Patent in Great Britain, July 28, 1886, No. 9,755,) of which the following is a specification.

This invention relates to gas lamps and burners adapted for use in heating to incandescence a refractory illuminating hood or mantle suspended above the burner; and it consists in the construction and combination of parts hereinafter described and claimed.

In the annexed drawings, Figures 1 and 2 are sectional elevations of gas-lamps embodying my invention, the lamps being shown with their chimneys and illuminating-hoods removed. Fig. 3 represents in side elevation a lamp with chimney and hood in position. Fig. 4 is a plan of the burner shown in Figs. 2 and 3, and Fig. 5 shows a modified form of burner in vertical section.

Each form of burner illustrated in the drawings is provided at its lower end with a vertically-perforated knob or thimble 1, that is threaded for attachment to a gas-fixture. This knob or thimble supports the burner, into the lower end of which, as in an ordinary Bunsen burner, are introduced supplies of gas and air through separate inlets.

As shown in Figs. 1 and 2, a perforated disk 2 is secured to the upper end of the knob or thimble 1, to divide the gas-supply into jets and facilitate the mixture with the supply of air. A shell 3, having lateral air-inlets 4, may be secured around the thimble 1, as shown in Figs. 1, 2, and 3, and in this form of construction the burner-tube 5 is secured to the upper end of said shell. If desired, the shell 3 may be surrounded with a globular shield 6, having air-inlets 7, as shown in Fig. 1, and as shown in Fig 2 the shield 3 may be continuous with a gallery 8 for supporting a chimney.

Instead of supporting the burner-tube 5 on a shell, 3 secured to the thimble 1, the shell 3 may be dispensed with and the lower end of the burner-tube attached directly to the thimble, as shown in Fig. 5. In this construction a shoulder 9 is formed in the thimble 1 to support the perforated disk 2, and the burner-tube 5 is inserted into the thimble with its lower end resting on said disk. The lateral air-inlets 4 will be formed in the lower end of the burner-tube, above the thimble, and if desired a bell-shaped shield 6ª can be supported on a ring 10, shrunk onto the burner-tube above the lateral air-inlets.

The number and size of the perforations in the disk 2 and of the lateral air-inlets 4 can be varied as required according to the quality of the gas, and if desired the quantity of gas supplied to the burner can be regulated from time to time by means of a set-screw 11, inserted through the thimble to project into the main gas-passage below the perforated disk, as shown in Fig. 1.

The burner-tube 5 may be surmounted or capped by a dome-shaped wire-gauze grating 12, as shown in Fig. 1, or by a flat grating, as in Figs. 2, 3, and 4. The grating shown in Figs. 2, 3, and 4 has a central vertically-projecting cone 13, surrounded by an inner annular series of perforations 14 and an outer series of radiating slots 15, the mixture of air and gas being thus divided into a number of jets at the point of ignition.

In Fig. 5 the burner-tube is surmounted by a hemispherical chamber 16, inclosing a series of vertical air-tubes 17, open at both ends. The lower ends of these tubes are attached to the bottom of the hemispherical chamber outside the burner-tube, and their upper ends are attached to a perforated disk or cover 12ª, which is somewhat smaller in diameter than the top of the hemisphere and does not quite extend to its periphery, so that there is all around the cover a narrow annular passage 18, through which the mixture of air and gas issues, forming, when ignited, an annular flame. The air-tubes 17 extend through the hemisphere on the outside of the burner-tube 5, and convey air in divided currents into the space inclosed by the annular flame, and this air, together with that on the outside of the annular flame, serves for the complete combustion of the gas.

The gallery 8 carries a chimney 19, and may also be adapted to support a globe. Within the chimney and suspended above the burner is a mantle or hood 20 of incandescent material. This mantle or hood is attached to a horizontal ring formed on a bent rod 21, that is supported by the gallery. The gallery may also support a bent rod 22 for guiding the chimney to prevent it from damaging the mantle or hood. These rods 21 and 22 are inserted in perforated lugs 23, formed on the gallery, and by means of set-screws 24 can be adjusted vertically, as desired. The lugs 23 and set-screws 24, for supporting the rods 21 and 22, may be located on a laterally-extended portion of the gallery, as shown in Figs. 1 and 2, or on its lower supporting-collar 25, as shown in Fig. 3, the arrangement shown in Figs. 1 and 2 being preferable, as it requires less bending of the rod and enables it to be more readily adjusted. As shown in Fig. 4, the set-screw 24 may be supported in cheeks 26, formed by bending parts of the metal gallery-wing 27 in opposite directions.

The operation of this gas-lamp will be readily understood, and it will be seen that it is particularly adapted for heating to incandescence a refractory hood or mantle, causing it to emit a brilliant light. I may observe that it is advantageous to cause the combustible gas used for the burner to issue through a hole or holes in a very thin sheet metal plate—such as the perforated disk 2—and not through a plate of from one to one and one-half millimeter in thickness, as in the ordinary Bunsen burner. This affords the advantage that the gas retains its full pressure and that a perfect mixture of gas and air is produced. It will be seen that the gallery 8 comprises a series of converging ribs $8^a$, of any suitable number, arranged at such intervals as to afford the requisite strength and yet admit the ready insertion of a lighted match to ignite the gas without raising the chimney or harming the mantle.

What I claim as my invention is—

1. The combination of a burner-tube provided with a cap having a vertically-projecting cone 13, surrounded by an inner annular series of perforations 14 and an outer annular series of radiating slots 15, a hood of refractory incandescent material suspended above said burner-cap, and a chimney surrounding said hood, substantially as described.

2. The combination, with the burner-tube 5 and gallery 8, having lugs 23 and set-screws 24, located on a laterally-extended portion of the gallery-body, of the chimney 19, the hood 20, and the vertically-adjustable rods 21 and 22, substantially as described.

3. The combination of a vertically-perforated thimble having a gas-inlet, a perforated disk supported by said thimble, a Bunsen burner having lateral air-inlets, and a shield located around the burner air-inlets, substantially as described.

4. The combination of a Bunsen burner having lateral air-inlets, a ring shrunk onto the burner-tube above the air-inlets, and a shield suspended from said ring and surrounding the air-inlets of the burner, substantially as described.

5. The combination, with a gas-burner and a chimney-gallery, of a vertically-adjustable rod supported by the gallery and an incandescing hood suspended from said rod above the burner, substantially as described.

6. The combination, with a gas-burner, a chimney, and an incandescing hood suspended in said chimney, of a gallery having converging ribs $8^a$, arranged at intervals, substantially as described.

In testimony whereof I affix my signature in presence of two witnesses.

CARL AUER VON WELSBACH.

Witnesses:
FRED WILLIAMS,
EDMUND JUSSEN.